US010781882B2

(12) United States Patent
Sekine et al.

(10) Patent No.: US 10,781,882 B2
(45) Date of Patent: Sep. 22, 2020

(54) TORQUE FLUCTUATION ABSORBING APPARATUS

(71) Applicant: AISIN SEIKI KABUSHIKI KAISHA, Kariya-shi, Aichi-ken (JP)

(72) Inventors: Tsutomu Sekine, Kariya (JP); Miki Torii, Nishio (JP); Moritaka Shibata, Handa (JP); Satoshi Nakagaito, Kariya (JP); Masami Okumaru, Kariya (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 281 days.

(21) Appl. No.: 15/704,257

(22) Filed: Sep. 14, 2017

(65) Prior Publication Data

US 2018/0163814 A1 Jun. 14, 2018

(30) Foreign Application Priority Data

Dec. 14, 2016 (JP) .................. 2016-241978
May 15, 2017 (JP) .................. 2017-096377

(51) Int. Cl.
*F16F 15/123* (2006.01)
*F16F 15/129* (2006.01)

(52) U.S. Cl.
CPC ........ *F16F 15/1232* (2013.01); *F16F 15/123* (2013.01); *F16F 15/129* (2013.01); *F16F 15/12353* (2013.01); *F16F 2230/0082* (2013.01)

(58) Field of Classification Search
CPC .... F16F 15/1232; F16F 15/123; F16F 15/129; F16F 2230/0082; F16F 15/12353

USPC ....... 464/68.41; 192/213.12, 213.22, 213.31, 192/214.1
See application file for complete search history.

(56) References Cited

U.S. PATENT DOCUMENTS

| 4,596,535 | A  | * | 6/1986 | Ooga | F16F 15/129 |
|           |    |   |        |      | 192/213.22 |
| 6,264,563 | B1 | * | 7/2001 | Mizukami | F16F 15/12366 |
|           |    |   |        |      | 192/213.22 |
| 8,066,574 | B2 | * | 11/2011 | Hada | F16F 15/123 |

FOREIGN PATENT DOCUMENTS

JP 2016-098954 A 5/2016
WO WO 2009/036727 A1 3/2009

* cited by examiner

*Primary Examiner* — Greg Binda
(74) *Attorney, Agent, or Firm* — Buchanan Ingersoll & Rooney PC

(57) ABSTRACT

A torque fluctuation absorbing apparatus absorbs torque fluctuations occurring in a torque transmission pathway from an input side rotating member to an output side rotating member. The apparatus includes: a vibration absorbing member in which elastic members are coupled in series, and which absorbs torque fluctuations; circular outer contour plates coupled to the input side rotating member, and disposed to be spatially separated from one another in an axial direction of the output side rotating member; a hub member including a boss section coupled to the output side rotating member, and a flange section provided on the boss section and disposed between the outer contour plates; and a circular intermediate plate disposed between the flange section and the outer contour plates, coupled between the elastic members, and transmitting a torque from one elastic member to another elastic member.

4 Claims, 11 Drawing Sheets

RADIAL DIRECTION

CIRCUMFERENTIAL DIRECTION

US 10,781,882 B2

TORQUE FLUCTUATION ABSORBING APPARATUS

CROSS REFERENCE TO RELATED APPLICATIONS

This application is based on and claims priority under 35 U.S.C. § 119 to Japanese Patent Applications 2016-241978 and 2017-096377, filed on Dec. 14, 2016 and May 15, 2017, respectively, the entire contents of which are incorporated herein by reference.

TECHNICAL FIELD

This disclosure relates to a torque fluctuation absorbing apparatus that is installed between a drive source and a transmission.

BACKGROUND DISCUSSION

In the related art, the rotational vibration damper disclosed in WO2009/036727 is known. The rotational vibration damper of the related art is provided with an intermediate plate that serializes a plurality of springs and transmits a spring force of one spring to another spring, and a hub that transmits transmission torque transmitted via the other spring to an output shaft.

Generally, in a torque fluctuation absorbing apparatus such as the above-mentioned rotational vibration damper of the related art, the position in the axial direction of the intermediate plate is determined using outer contour plates, which are disposed so as to be spatially separated from one another in the axial direction, as references, and the position in the axial direction of a flange section provided in the hub is determined using the intermediate plate as a reference. In this case, the position in the axial direction of the intermediate plate is disposed within an allowable tolerance using the outer contour plate as references, and the position in the axial direction of the flange section is disposed within an allowable tolerance using the intermediate plate as a reference. Accordingly, the positions in the axial direction of the flange section and the intermediate plate are determined within a range to which the allowable tolerances are added.

In addition, in a torque fluctuation absorbing apparatus, various members such as springs and thrust members are provided in order to suppress (dampen) vibrations in a rotation direction. In this case, the flange section and the intermediate plate are disposed in the axial direction so as to couple the springs, or the like. In this case, an allowable tolerance is set for the springs, or the like. Accordingly, it is necessary to determine the positions in the axial direction of the flange section and the intermediate plate so as to couple the springs, or the like, within the allowable tolerance for the springs, or the like. In addition, an allowable tolerance is also set for the outer contour plates so that the springs, or the like, within the allowable tolerance can be accommodated in an inner section in order to avoid inhibiting the action of the springs, or the like.

Accordingly, in a case in which the position in the axial direction of the intermediate plate is determined using the outer contour plates as references, and the position in the axial direction of the flange section is determined using the intermediate plate as a reference, it is necessary to determine the positions in the axial direction of the flange section and the intermediate plate by adding the allowable tolerances set in each material. In this case, the dimension in the axial direction of the torque fluctuation absorbing apparatus is increased, leading to an increase in the size of the torque fluctuation absorbing apparatus.

Thus, a need exists for a torque fluctuation absorbing apparatus which is not susceptible to the drawback mentioned above.

SUMMARY

A torque fluctuation absorbing apparatus according to an aspect of this disclosure absorbs torque fluctuations that occur in a torque transmission pathway from an input side rotating member to an output side rotating member, and includes a vibration absorbing member in which a plurality of elastic members are coupled in series, and which absorbs torque fluctuations, a pair of circular outer contour plates, that are coupled to the input side rotating member and are disposed so as to be spatially separated from one another in an axial direction of an output side rotating member, a hub member that includes a boss section, which is coupled to the output side rotating member, and a flange section, which is provided on the boss section and is disposed between the pair of outer contour plates, and a circular intermediate plate, that is disposed between the flange section of the hub member, and the pair of outer contour plates, is coupled between the serial elastic members that configure the vibration absorbing member, and transmits a torque from one elastic member among the serial elastic members to another elastic member among the serial elastic members, in which a flange section position, which is a position in the axial direction of the flange section, is determined using a position in the axial direction of a reference outer contour plate, which is one of the pair of outer contour plates as a reference, and an intermediate plate position, which is a position in the axial direction of the intermediate plate, is determined using a position in the axial direction of the reference outer contour plate, as a reference.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
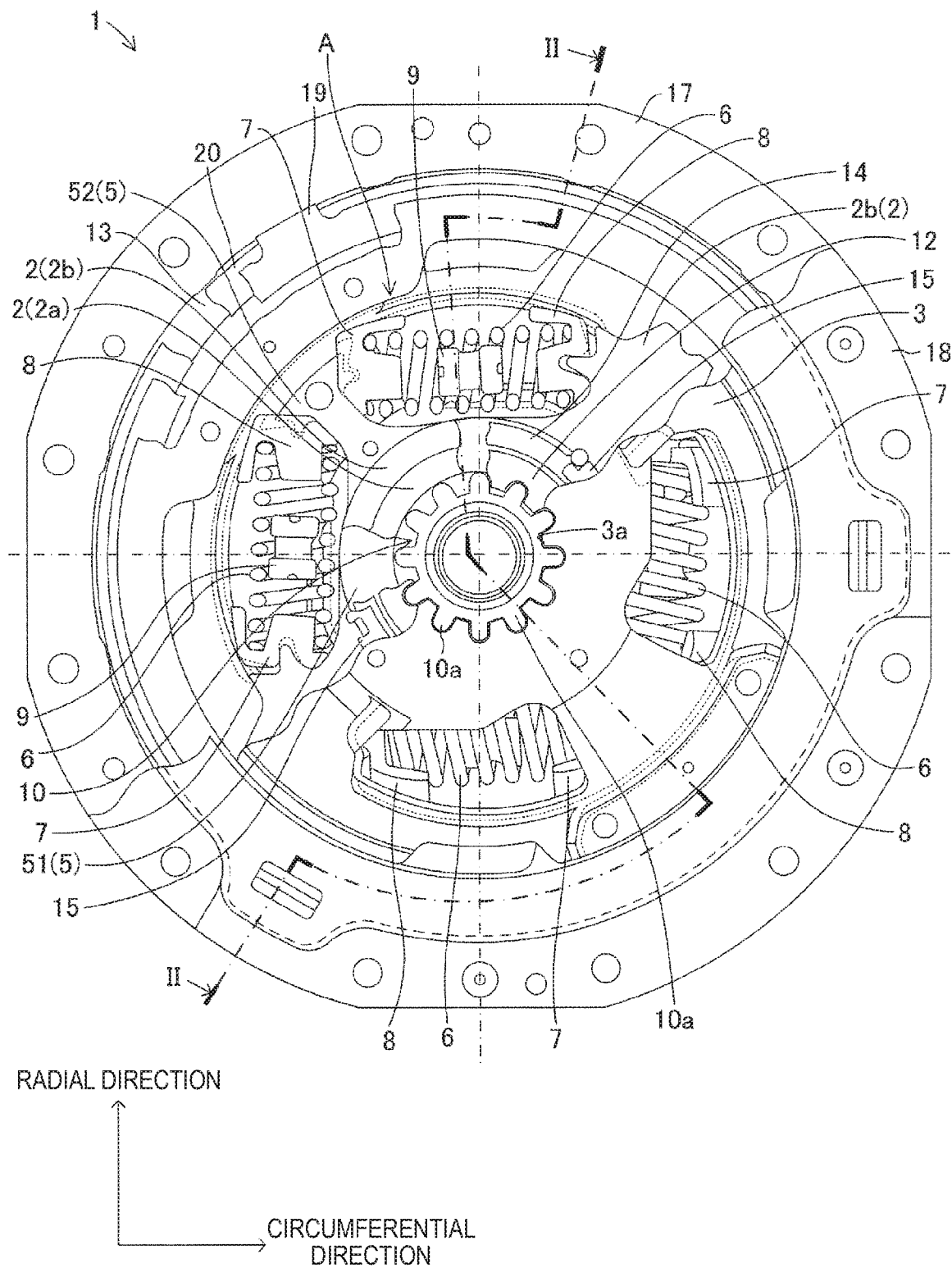
FIG. 1 relates to a first embodiment of the present disclosure, and is a partial cutout view that shows a configuration of a torque fluctuation absorbing apparatus.

Hereinafter, embodiments of the present disclosure will be described while referring to the drawings. Additionally, in each of the embodiments and modification examples below, in the drawings, the same reference symbols will be given to portions that are identical to or are equivalent to one another. In addition, each drawing used in the description is a conceptual view, and there are cases in which the shape of each portion is not necessarily a rigorous condition.

First Embodiment

A torque fluctuation absorbing apparatus 1 (hereinafter, also referred to as "the present apparatus 1") according to the present embodiment can be applied to a hybrid vehicle, for example. The present apparatus 1 is provided on an output shaft (not illustrated in the drawings) of an engine (not illustrated in the drawings), and is an apparatus that absorbs (suppresses) fluctuating torque of the engine and an electric motor (not illustrated in the drawings).

Figure 2:
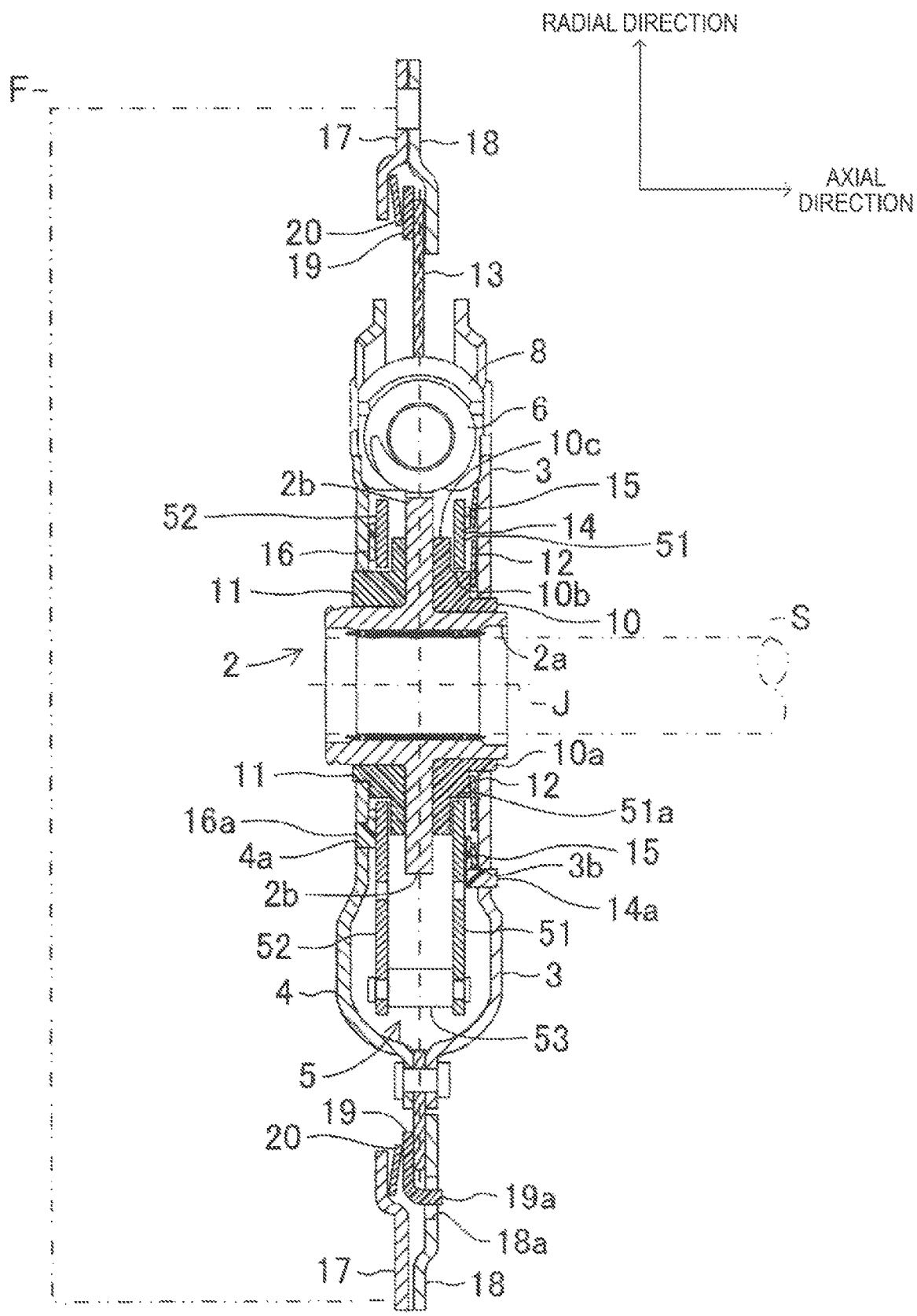
FIG. 2 is a cross-sectional view that shows the torque fluctuation absorbing apparatus along a cross-section II-II in FIG. 1.

As shown in FIGS. 1 and 2, the present apparatus 1 of the present embodiment is provided with a hub member 2, a disk plate 3 and a disk plate 4 as a pair of outer contour plates that are coupled by a flywheel F, which is an input side rotating member, and an intermediate plate 5. The hub member 2, the disk plate 3, the disk plate 4, and the intermediate plate 5 are capable of rotating around an axis of rotation J. Additionally, in the following description, a direction that is orthogonal to the axis of rotation J will be referred to as a "radial direction of the axis of rotation J" or simply a "radial direction", a direction that runs parallel to the axis of rotation J will be referred to as an "axial direction of the axis of rotation J" or simply an "axial direction", and a direction of rotating around the axis of rotation J will be referred to as "a circumferential direction of the axis of rotation J" or simply a "circumferential direction". In addition, in the following description, among the pair of outer contour plates, the disk plate 3 will be used as a reference outer contour plate.

The hub member 2 includes a boss section 2a and a flange section 2b. The boss section 2a is formed in a cylindrical form that extends in the axial direction of the axis of rotation J, and spline engages with an input shaft S, which is an output side rotating member of a transmission (not illustrated in the drawings), on the inner circumferential side. The flange section 2b is disposed between the disk plate 3 and the disk plate 4, which are the pair of outer contour plates, and is formed so as to extend in the radial direction of the axis of rotation J on the outer circumferential side of the boss section 2a. The flange section 2b forms, in an intermediate portion, a window section for housing a coil spring 6, a spring sheet 7, a spring sheet 8, and a small spring 9, which will be mentioned later, and comes into contact with the spring sheet 7 and the spring sheet 8 in a manner that is capable of contacting and becoming separated therefrom. As shown in FIG. 2, the flange section 2b comes into contact with a thrust member 10, as a first sliding-contact member, at a surface on a side that faces the disk plate 3, and comes into contact with a thrust member 11 at a surface on a side that faces the disk plate 4.

The disk plate 3, as a reference outer contour plate, is formed in a circular form, and is disposed so as to be spatially separated (on the right side in FIG. 2) in the axial direction from the flange section 2b of the hub member 2. The disk plate 3 includes a plurality of concave and convex sections in an inner circumferential section 3a, and a rotation stopping section 10a of the thrust member 10, as the first sliding-contact member which will be mentioned later, fits together with the concave and convex sections. As a result of this, the inner circumferential section 3a of the disk plate 3 is configured so as to be incapable of rotating relative to the thrust member 10. The disk plate 3 comes into contact with one end of a disk spring 12, as a first pressing member that is disposed between a surface on a side that faces the flange section 2b of the hub member 2 and the thrust member 10, at the surface on the side that faces the flange section 2b. The disk plate 3 includes, in an intermediate portion, a window section for housing the coil spring 6, the spring sheet 7, the spring sheet 8, and the small spring 9, and a circumferential direction end surface of the window section comes into contact with the spring sheet 7 and the spring sheet 8 in a manner that is capable of contacting and becoming separated therefrom. The disk plate 3 is fixed further on the outer circumferential side than the coil spring 6 by a support plate 13, which will be mentioned later, and for example, a rivet.

The disk plate 4 is formed in a circular form, and is disposed so as to be spatially separated (on the left side in FIG. 2) in the axial direction from the flange section 2b of the hub member 2. The disk plate 4 is coupled to the thrust member 11 at an inner circumferential section. As a result of this, the inner circumferential section of the disk plate 4 is configured so as to be incapable of rotating relative to the thrust member 11. The disk plate 4 includes, in an intermediate portion, a window section for housing a coil spring 6, a spring sheet 7, a spring sheet 8, and a small spring 9, and a circumferential direction end surface of the window section comes into contact with the spring sheet 7 and the spring sheet 8 in a manner that is capable of contacting and becoming separated therefrom. The disk plate 4 is fixed further on the outer circumferential side than the coil spring 6 by the support plate 13, and for example, a rivet.

The intermediate plate 5 is disposed in the axial direction of the axis of rotation J between the disk plate 3 and the disk plate 4, or more specifically, between the flange section 2b of the hub member 2 and the disk plate 3 and the disk plate 4. The intermediate plate 5 is a component that couples a plurality of (two in the present embodiment) the coil springs 6 in series via the spring sheets 7 and the spring sheets 8, and transmits a torque from one coil spring 6 to another coil spring 6. The intermediate plate 5 is configured from a first plate 51 and a second plate 52.

The first plate 51 is disposed in the axial direction of the axis of rotation J so as to face the disk plate 3. The first plate 51 is formed in a circular form, and as shown in FIG. 2, is inserted through a small diameter section 10b of the thrust member 10, which is the first sliding-contact member which will be mentioned later, at an inner circumferential section 51a. As a result of this, the first plate 51 is in contact with the small diameter section 10b of the thrust member 10, and is axially supported by the small diameter section 10b of the thrust member 10. As shown in FIG. 2, the first plate 51 is disposed so as to be spatially separated (on the right side in FIG. 2) in the axial direction from the flange section 2b of the hub member 2. More specifically, the first plate 51 is disposed so as to face the flange section 2*b* of the hub member 2 and so that a gap is formed between a surface on a side that faces the thrust member 10 and the thrust member 10. In addition, the position of the disposition of the first plate 51 in the axial direction of the axis of rotation J relative to the disk plate 3 is determined by a thrust member 14, as a second sliding-contact member that is disposed between a surface that faces the disk plate 3 and the disk plate 3, and a disk spring 15, as a second pressing member. Additionally, the thrust member 14 is biased toward the first plate 51 by the disk spring 15.

The second plate 52 is disposed in the axial direction of the axis of rotation J so as to face the disk plate 4. The second plate 52 is formed in a circular form, and as shown in FIG. 2, an inner circumferential section is in contact with the thrust member 11. That is, the second plate 52 is axially supported by the thrust member 11. As shown in FIG. 2, the second plate 52 is disposed so as to be spatially separated (on the left side in FIG. 2) in the axial direction from the flange section 2*b* of the hub member 2. More specifically, the second plate 52 is disposed so as to face the flange section 2*b* of the hub member 2 and so that a gap is formed between a surface on a side that faces the thrust member 11 and the thrust member 11. In addition, the position of the second plate 52 in the axial direction of the axis of rotation J is determined by a thrust member 16, which is disposed between a surface that faces the disk plate 4 and the disk plate 4.

As shown in FIG. 2, the first plate 51 and the second plate 52 are coupled in an integral manner by a pin member 53. The pin member 53 is fixed as a result of the first plate 51 being crimped at an end section on the disk plate 3 side. In addition, the pin member 53 is fixed as a result of the second plate 52 being crimped at an end section on the disk plate 4 side.

As shown in FIG. 1, the coil springs 6, which are elastic members, are housed in the window sections that are formed in the disk plate 3, the disk plate 4, the flange section 2*b* of the hub member 2, and the intermediate plate 5 (the first plate 51 and the second plate 52). The coil springs 6 come into contact with the spring sheets 7 and the spring sheets 8, which are installed at both ends. The coil springs 6 contract when the disk plate 3 and the disk plate 4 and the flange section 2*b* rotate relatively in the circumferential direction of the axis of rotation J. As a result of this, the coil springs 6 absorb shocks that arise due to differences in rotation between the disk plate 3 and the disk plate 4, the flange section 2*b*, and the intermediate plate 5 (the first plate 51 and the second plate 52).

The spring sheets 7 and the spring sheets 8 are respectively provided in end sections of the coil springs 6 in the circumferential direction. The spring sheets 7 and the spring sheets 8 are respectively housed in the window sections that are formed in the disk plate 3, the disk plate 4, the flange section 2*b* of the hub member 2, and the intermediate plate 5 (the first plate 51 and the second plate 52). As a result of this, the spring sheets 7 and the spring sheets 8 are disposed between the window sections and the end sections of the coil springs 6.

The small springs 9 are installed on the inner circumferential side of the coil springs 6. The small springs 9 abut against the facing spring sheets 7 and the spring sheets 8 when the coil spring 6 contracts. As a result of this, the small springs 9 absorb shocks that arise due to differences in rotation between the disk plate 3 and the disk plate 4, and the flange section 2*b*.

In this instance, coil springs 6, spring sheets 7, spring sheets 8, and small springs 9 that are coupled in series constitute a vibration absorbing member A.

The thrust member 10, which is the first sliding-contact member, is disposed between the disk spring 12, which is the outer circumference of the boss section 2*a* of the hub member 2 and is the first pressing member, and the flange section 2*b* of the hub member 2, and makes sliding contact with the boss section 2*a* and the flange section 2*b*. As shown in FIGS. 1 and 2, the thrust member 10 is provided with the rotation stopping section 10*a*, the small diameter section 10*b*, and a large diameter section 10*c*. As shown in FIG. 1, the rotation stopping section 10*a* is formed, in a portion that extends to the disk plate 3 side, in a concave-convex form in the circumferential direction of the axis of rotation J in order to disable rotation relative to the disk plate 3 and the disk spring 12. The small diameter section 10*b* is inserted through the inner circumferential section 51*a* of the first plate 51 of the intermediate plate 5. The large diameter section 10*c* makes sliding contact with the flange section 2*b* with a larger diameter than the small diameter section 10*b*. The outer diameter of the large diameter section 10*c* is set to be greater than the inner diameter of the inner circumferential section 51*a* of the first plate 51 of the intermediate plate 5.

The thrust member 10 is biased to the flange section 2*b* side by the disk spring 12. As a result of this, the thrust member 10 works in cooperation with the disk spring 12, and determines the position in the axial direction of the axis of rotation J of the hub member 2 (or more specifically, the flange section 2*b* of the hub member 2), that is, a flange section position, using the position in the axial direction of the disk plate 3, which is the reference outer contour plate, as a reference.

The thrust member 11 is disposed between the disk plate 4, which is the outer circumference of the hub member 2, and the flange section 2*b* of the hub member 2, and makes sliding contact with the flange section 2*b*. The thrust member 11 is coupled by the disk plate 4 at a portion that extends to the disk plate 4 side on the inner circumferential side so as to be incapable of relative rotation and to be capable of moving in the axial direction.

The disk spring 12, which is the first pressing member, is disposed at the outer circumference of the thrust member 10 between the thrust member 10 and the disk plate 3. The disk spring 12 biases the thrust member 10 to the flange section 2*b* of the hub member 2 side. As shown in FIG. 1, the disk spring 12 has concave and convex sections that correspond to the rotation stopping section 10*a* of the thrust member 10 in the inner circumferential section, the rotation stopping section 10*a* is engaged with the concave and convex sections, and is assembled so as to be incapable of rotating relative to the thrust member 10 and to be capable of moving in the axial direction.

The support plate 13 is formed in a circular form that extends in the radial direction of the axis of rotation J over a larger diameter than the disk plate 3 and the disk plate 4. The support plate 13 is fixed between the disk plate 3 and the disk plate 4 by the disk plate 3 and the disk plate 4 and a rivet, for example. In the support plate 13, a support plate 17, a cover plate 18, a friction plate 19, and a disk spring 20 are assembled in an outer circumferential side portion. Additionally, the support plate 13, the support plate 17, the cover plate 18, the friction plate 19, and the disk spring 20 configure a limit mechanism of the present apparatus 1.

The thrust member 14, which is the second sliding-contact member, is disposed between the disk plate 3 and the first plate 51 of the intermediate plate 5 further on the outward side in the radial direction than the thrust member 10, and makes sliding contact with the first plate 51. The thrust member 14 is biased toward the first plate 51 side by the disk spring 15, which is the second pressing member. The thrust member 14 includes an escape prevention section 14a, which extends passing through a hole section 3b provided further on the outer circumferential side than an abutting section of the disk plate 3 with the disk spring 15. The thrust member 14, which is assembled on the disk plate 3 as a result of engagement of the escape prevention section 14a and the hole section 3b, works in cooperation with the disk spring 15, and determines the position in the axial direction of the axis of rotation J of the first plate 51, that is, an intermediate plate position, using the position in the axial direction of the disk plate 3, which is the reference outer contour plate, as a reference.

The disk spring 15, which is the second pressing member, is disposed between the disk plate 3 and the thrust member 14. The disk spring 15 biases the thrust member 14 toward the first plate 51 side. Accordingly, the disk spring 15 determines the intermediate plate position of the first plate 51 using the position in the axial direction of the disk plate 3 as a reference.

The thrust member 16 is disposed between the disk plate 4 and the second plate 52 of the intermediate plate 5 further on the outward side in the radial direction than the thrust member 11, and makes sliding contact with the second plate 52. The thrust member 16 includes an escape prevention section 16a, which extends passing through a hole section 4a provided on the disk plate 4 further on the outward side in the radial direction than the thrust member 11. The thrust member 16, which is assembled on the disk plate 4 as a result of engagement of the escape prevention section 16a and the hole section 4a, determines the position in the axial direction of the second plate 52 relative to the disk plate 4.

The support plate 17 is formed in a circular form. The support plate 17 is disposed between the flywheel F and the cover plate 18 in the vicinity of the outer circumference. For example, the support plate 17 is fixed to the cover plate 18 by a rivet, and is fixed to the cover plate 18 and the flywheel F by a bolt and a nut which are not illustrated in the drawings. The support plate 17 is spatially separated from the cover plate 18 on the inner circumferential side. The support plate 17 comes into contact with one end side of the disk spring 20 so as to be capable of sliding.

The cover plate 18 is formed in a circular form. The cover plate 18 is disposed so as to face a surface of the support plate 17 that is opposite a surface on the flywheel F side in the vicinity of the outer circumference. For example, the cover plate 18 is fixed to the support plate 17 by a rivet, and is fixed to the support plate 17 and the flywheel F by a bolt and a nut which are not illustrated in the drawings. The cover plate 18 is spatially separated from the support plate 17 on the inner circumferential side. The cover plate 18 comes into contact with the support plate 13 so as to be capable of sliding.

The friction plate 19 is formed in an annular form, and is held on the outer circumferential side of the support plate 13. The friction plate 19 is disposed between the support plate 13 and the other end side of the disk spring 20, and comes into contact with the support plate 13 so as to be capable of sliding. The friction plate 19 includes an escape prevention section 19a, which extends passing through a hole section 18a provided on the cover plate 18 further on the outward side in the radial direction than the support plate 13. As a result of engagement of the escape prevention section 19a and the hole section 18a, the friction plate 19 is fixed so as to be incapable of rotating relative to the cover plate 18, and is biased to the support plate 13 side by the disk spring 20.

The disk spring 20 is disposed between the support plate 17 and the friction plate 19. The disk spring 20 biases the friction plate 19 toward the support plate 13 side. In this instance, the support plate 17, the cover plate 18, the friction plate 19, and the disk spring 20 exhibit a limiter function of the present apparatus 1. That is, as a result of the disk spring 20 biasing the friction plate 19 toward the support plate 17, a frictional force is generated between the support plate 17 and the friction plate 19. In a case in which the relative torque that causes the relative rotation between the flywheel F and the input shaft S becomes excessive, the frictional force causes slipping between the friction plate 19, which is coupled to the flywheel F side, and the support plate 13, which is coupled to the input shaft S side. As a result of this, a circumstance in which excessive relative torque is transmitted to the input shaft S side from the flywheel F is prevented.

As can be understood from the above-mentioned description, the torque fluctuation absorbing apparatus 1 of the first embodiment is a torque fluctuation absorbing apparatus that absorbs vibrations caused by torque fluctuations that occur in a torque transmission pathway from the flywheel F, which is the input side rotating member, to the input shaft S of a transmission, which is the output side rotating member, in which the torque fluctuation absorbing apparatus is provided with the vibration absorbing member A (the coil springs 6, the spring sheets 7 and 8, and the small springs 9) in which the coil springs 6, which are a plurality of elastic members, are coupled in series, and which absorbs vibrations caused by torque fluctuations, the disk plates 3 and 4, which are a pair of outer contour plates that are coupled to the flywheel F and are disposed so as to be spatially separated from one another in the axial direction of the input shaft S of the transmission, the hub member 2 that includes the boss section 2a, which is coupled to the input shaft S of the transmission, and the flange section 2b, which is provided on the boss section 2a and is disposed between the disk plates 3 and 4, and the circular intermediate plate 5 (the first plate 51 and the second plate 52), which is disposed between the flange section 2b of the hub member 2, and the disk plates 3 and 4, is coupled between the serial coil springs 6 that configure the vibration absorbing member A, and transmits a torque from one coil spring 6 among the serial coil springs 6 to another coil spring 6 among the serial coil springs 6, the flange section position, which is the position in the axial direction of the flange section 2b of the hub member 2, is determined using the position in the axial direction of the disk plate 3, as the reference outer contour plate, which is one of the pair of disk plates 3 and 4, as a reference, and the intermediate plate position, which is the position in the axial direction of the first plate 51 of the intermediate plate 5, is determined using the position in the axial direction of the disk plate 3, which is the reference outer contour plate, as a reference.

According to such a configuration, the flange section position of the flange section 2b of the hub member 2 is determined using the disk plate 3, which is the reference outer contour plate, as a reference. In addition, the intermediate plate position of the first plate 51, which configures the intermediate plate 5, is determined using the disk plate 3, which is the reference outer contour plate, as a reference. That is, in the present apparatus 1, it is possible to determine the flange section position and the intermediate plate position independently of one another using the disk plate 3 as a reference.

Accordingly, since it is possible to reduce the number of members that determine the flange section position and it is possible to reduce the number of members that determine the intermediate plate position, it is possible to decrease the size of the allowable tolerance that is set and added. As a result of this, it is possible to reduce the dimension in the axial direction of the present apparatus 1, and therefore, it is possible to achieve miniaturization of the present apparatus 1.

In this case, the torque fluctuation absorbing apparatus 1 is provided with the thrust member 10, which is the first cylindrical sliding-contact member, is assembled at the outer circumference of the boss section 2a of the hub member 2, makes sliding contact with the boss section 2a, and makes sliding contact with the flange section 2b, the disk spring 12, which is the first pressing member, and presses the thrust member 10 from the disk plate 3, which is the reference outer contour plate, toward the flange section 2b, the thrust member 14, which is the second circular sliding-contact member, and makes sliding contact with the first plate 51 of the intermediate plate 5, and the disk spring 15, which is the second pressing member, and presses the thrust member 14 from the disk plate 3, which is the reference outer contour plate, toward the first plate 51 of the intermediate plate 5, the flange section position is determined by the thrust member 10 and the disk spring 12, and the intermediate plate position is determined by the thrust member 14 and the disk spring 15.

According to such a configuration, it is possible to determine the flange section position and the intermediate plate position using the thrust member 10 and the disk spring 12, and the thrust member 14 and the disk spring 15, which exhibit functions of absorbing (dampening) torque fluctuations. As a result of this, in addition it being possible to achieve miniaturization of the present apparatus 1 without it being necessary to add other members in order to determine the flange section position and the intermediate plate position, it is possible to reduce the manufacturing cost of the present apparatus 1.

In addition, in such cases, the thrust member 10, which is the first sliding-contact member, includes the small diameter section 10b, which is inserted through the first plate 51 of the intermediate plate 5, and the large diameter section 10c, which makes sliding contact with the flange section 2b, and is provided having a larger diameter than the outer diameter of the small diameter section 10b, and it is possible to provide the size of the outer diameter of the large diameter section 10c so as to greater than the size of the inner diameter of the inner circumferential section 51a of the first plate 51 of the intermediate plate 5.

According to such a configuration, since it is possible to make the outer diameter of the large diameter section 10c of the thrust member 10 greater than the inner diameter of the inner circumferential section 51a of the first plate 51, it is possible to increase the friction surface area of the large diameter section 10c that makes sliding contact with the flange section 2b. As a result of this, since it is possible to reduce the amount of wear that accompanies sliding contact of the large diameter section 10c, it is possible to decrease the thickness in the axial direction of the large diameter section 10c. Accordingly, since it is possible to reduce the dimension in the axial direction of the thrust member 10, it is possible to achieve miniaturization of the present apparatus 1.

In this case, the small diameter section 10b is capable of contacting the inner circumferential section 51a of the first plate 51 of the intermediate plate 5.

According to such a configuration, since the small diameter section 10b of the thrust member 10 is capable of contacting the inner circumferential section 51a as a result of being inserted through the first plate 51 of the intermediate plate 5, it is possible to axially support the first plate 51. As a result of this, it is not necessary to provide a separate bearing in order to axially support the first plate 51, and therefore, it is possible to reduce the manufacturing cost of the present apparatus 1.

In addition, in such cases, it is possible to make a magnitude of a thrust load generated as a result of the thrust member 10, which is the first sliding-contact member, making sliding contact with the flange section 2b and a magnitude of a thrust load generated as a result of the thrust member 14, which is the second sliding-contact member, making sliding contact with the first plate 51 of the intermediate plate 5 different from one another, and it is possible to make a magnitude of a pressing force with which the disk spring 12, which is the first pressing member, presses the thrust member 10 against the flange section 2b and a magnitude of a pressing force with which the disk spring 15, which is the second pressing member, presses the thrust member 14 onto the first plate 51 of the intermediate plate 5 different from one another.

Figure 3:
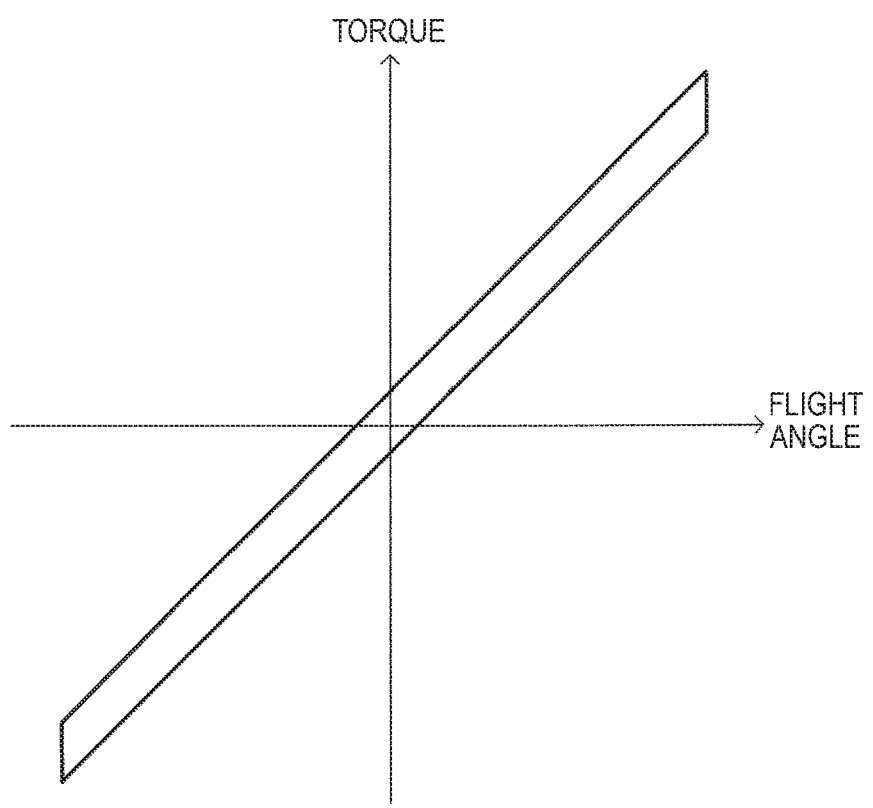
FIG. 3 is a view for describing hysteresis properties.

According to such a configuration, when the present apparatus 1 absorbs vibrations caused by torque fluctuations that occur in the torque transmission pathway, it is possible to suitably set hysteresis properties that represent the change properties of the torque (the transmission torque) relative to a flight angle that occurs with the input shaft S of the transmission. That is, for rotation fluctuations of the flange section 2b, it is possible to set hysteresis properties of torque relative to a flight angle at which a frictional force is applied to the flange section 2b by the thrust member 10 and the disk spring 12. In addition, for rotation fluctuations of the first plate 51, it is possible to set hysteresis properties of torque relative to a flight angle at which a frictional force is applied to the first plate 51 by the thrust member 14 and the disk spring 15. As a result of this, for example, it is possible to obtain hysteresis properties such as those shown in FIG. 3 by setting the thrust load of the thrust member 10 and the pressing force of the disk spring 12 so that the frictional force applied to the flange section 2b is greater than the frictional force applied to the first plate 51. Accordingly, in the present apparatus 1, it is possible to achieve miniaturization, and it is possible to suitably set hysteresis properties in order to reduce (dampen) vibrations caused by torque fluctuations.

Second Embodiment

In the above-mentioned first embodiment, hysteresis properties were obtained as a result of the thrust member 10, which is the first sliding-contact member, and the thrust member 11 makes sliding contact with the flange section 2b of the hub member 2. In this case, it is also possible to configure so as to vary the obtained hysteresis properties. Hereinafter, a second embodiment will be described in detail, but the same reference symbols will be given to the same portions as those of the first embodiment, and description thereof will be omitted.

Figure 4:
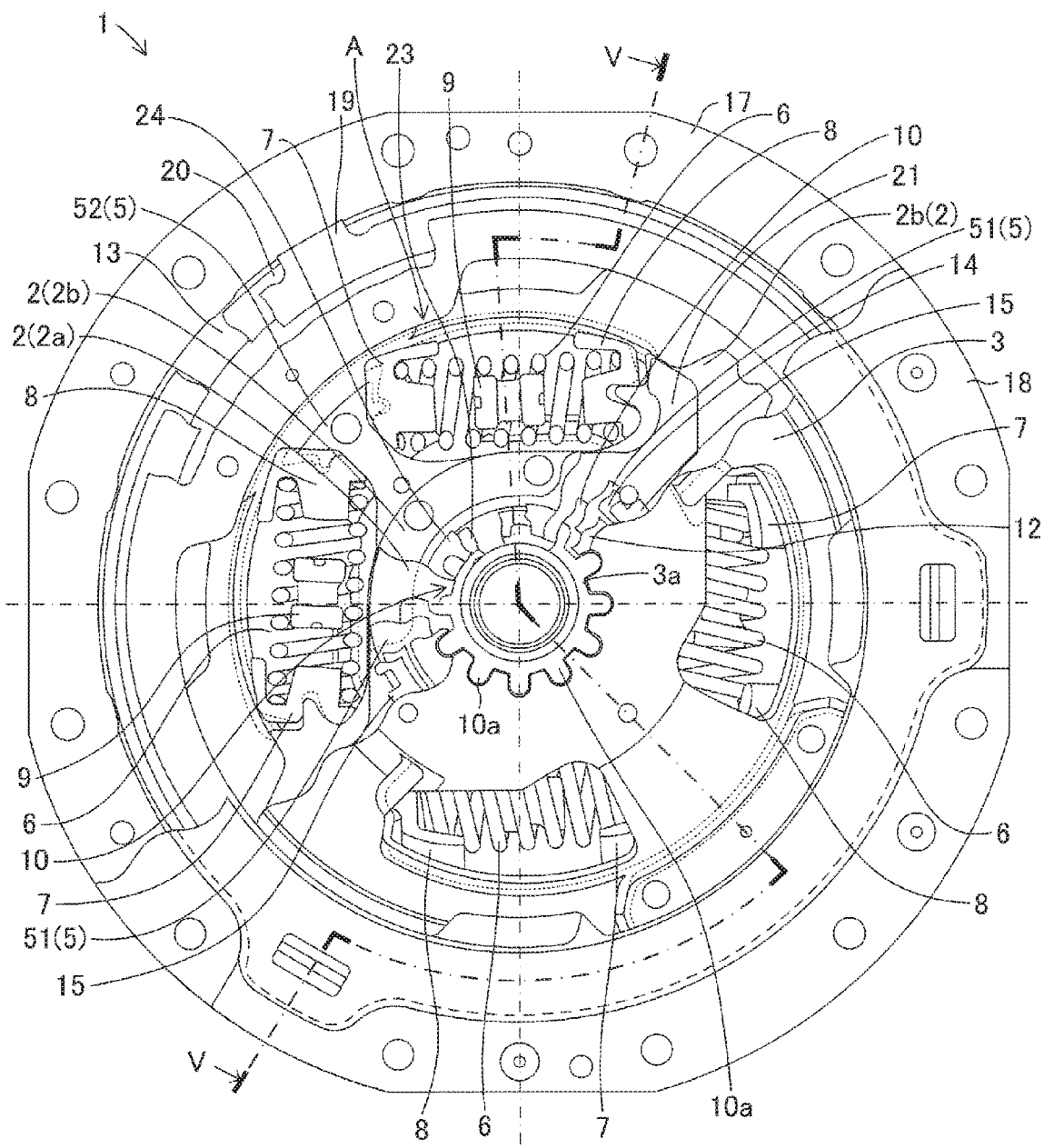
FIG. 4 relates to a second embodiment of the present disclosure, and is a partial cutout view that shows a configuration of a torque fluctuation absorbing apparatus.
Figure 5:
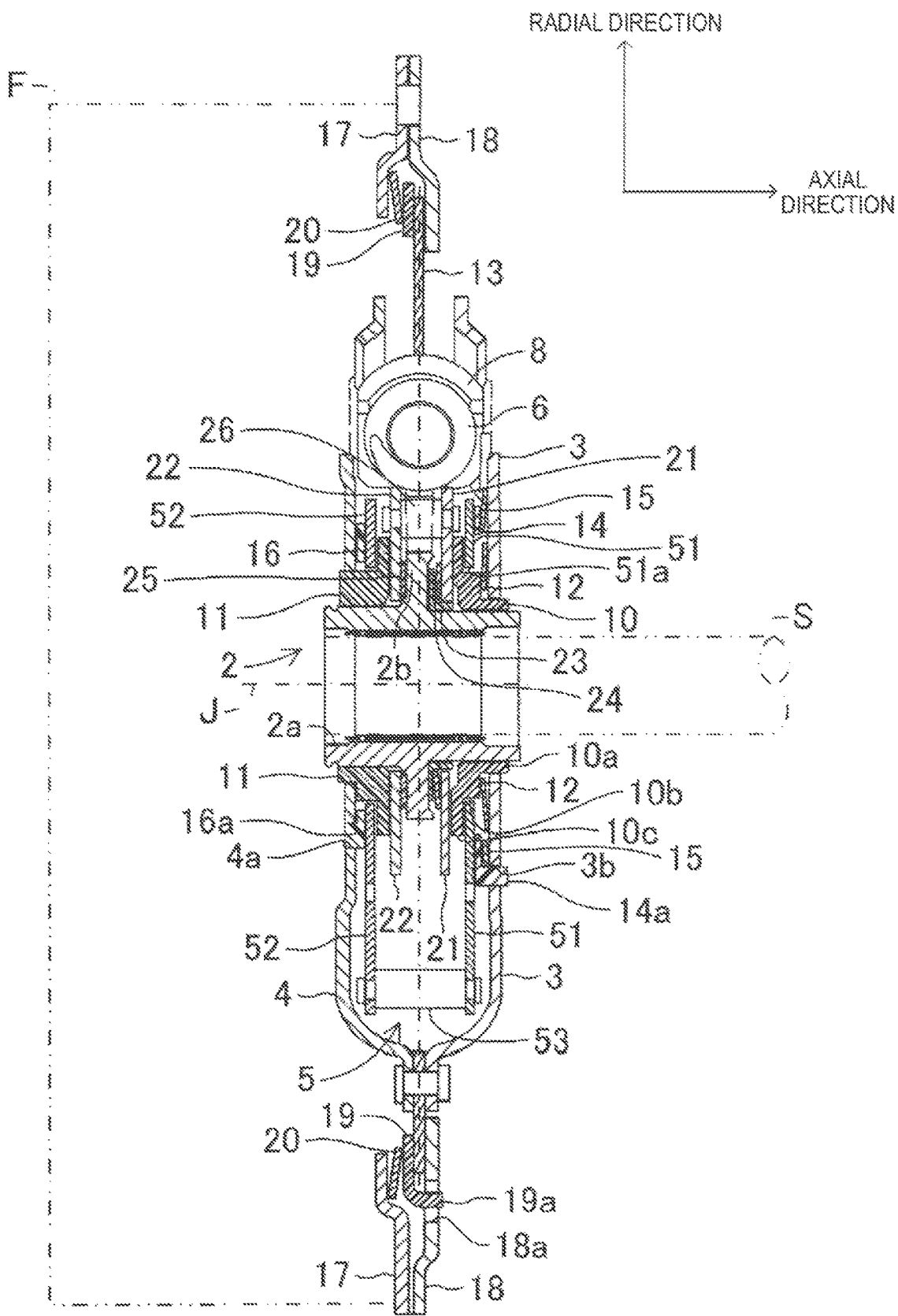
FIG. 5 is a cross-sectional view that shows the torque fluctuation absorbing apparatus along a cross-section V-V in FIG. 4.

In the second embodiment, as shown in FIGS. 4 and 5, a control plate 21, a control plate 22, a thrust member 23, a disk spring 24, a thrust member 25, and a pin member 26 are provided in the present apparatus 1 of the above-mentioned first embodiment.

The control plate 21 is disposed between the flange section 2b of the hub member 2 and the thrust member 10 on the disk plate 3 side in the axial direction of the axis of rotation J. The control plate 21 is formed in a circular form, and one surface side thereof comes into contact with the thrust member 10 so as to be capable of sliding. As a result of this, as shown in FIG. 5, the position of the disposition in the axial direction of the axis of rotation J of the control plate 21 is determined by the thrust member 10. In the control plate 21, an inner circumferential section is axially supported by the thrust member 23, which is disposed extending up to the boss section 2a of the hub member 2.

The control plate 22 is disposed between the flange section 2b of the hub member 2 and the thrust member 11 on the disk plate 4 side in the axial direction of the axis of rotation J. The control plate 22 is formed in a circular form, and one surface side thereof comes into contact with the thrust member 11 so as to be capable of sliding. In the control plate 22, an inner circumferential section is spatially separated from the outer circumference of the boss section 2a of the hub member 2.

The thrust member 23 is disposed between the flange section 2b of the hub member 2 and the control plate 21 at the outer circumference of the boss section 2a of the hub member 2, and makes sliding contact with the flange section 2b. The thrust member 23 is biased toward the flange section 2b of the hub member 2 by the disk spring 24.

The disk spring 24 is disposed between the control plate 21 and the thrust member 23. In the disk spring 24, one end side is fixed to a thrust member, and the other end side abuts against the other end side of the control plate 21. The disk spring 24 biases the control plate 21 toward the thrust member 10 side, and, as a result of a counter force thereof, biases the thrust member 23 toward the flange section 2b of the hub member 2 side.

In this instance, in the second embodiment, the flange section position of the flange section 2b of the hub member 2 is determined by the thrust member 10 and the thrust member 23, and the disk spring 12 and the disk spring 24. That is, in the second embodiment, the first sliding-contact member is configured by the thrust member 10 and the thrust member 23, and the first pressing member is configured by the disk spring 12 and the disk spring 24. Accordingly, in the second embodiment, the flange section position is determined independently of the intermediate plate 5 using the disk plate 3, which is the reference outer contour plate, as a reference.

The thrust member 25 is disposed between the flange section 2b of the hub member 2 and the other surface side of the control plate 22 at the outer circumference of the boss section 2a of the hub member 2, and makes sliding contact with the flange section 2b. The thrust member 25 determines the position in the axial direction of the control plate 22 relative to the flange section 2b.

As shown in FIG. 5, the pin member 26 fixes the control plate 21 as a result of crimping at an end section on the disk plate 3 side. In addition, the pin member 26 fixes the control plate 22 as a result of crimping at an end section on the disk plate 4 side. In this instance, the size of the outer diameter of the pin member 26 is set to be smaller than the size of the inner diameter of through-holes that are formed in the control plates 21 and 22 and through which the pin member 26 passes.

Figure 6:
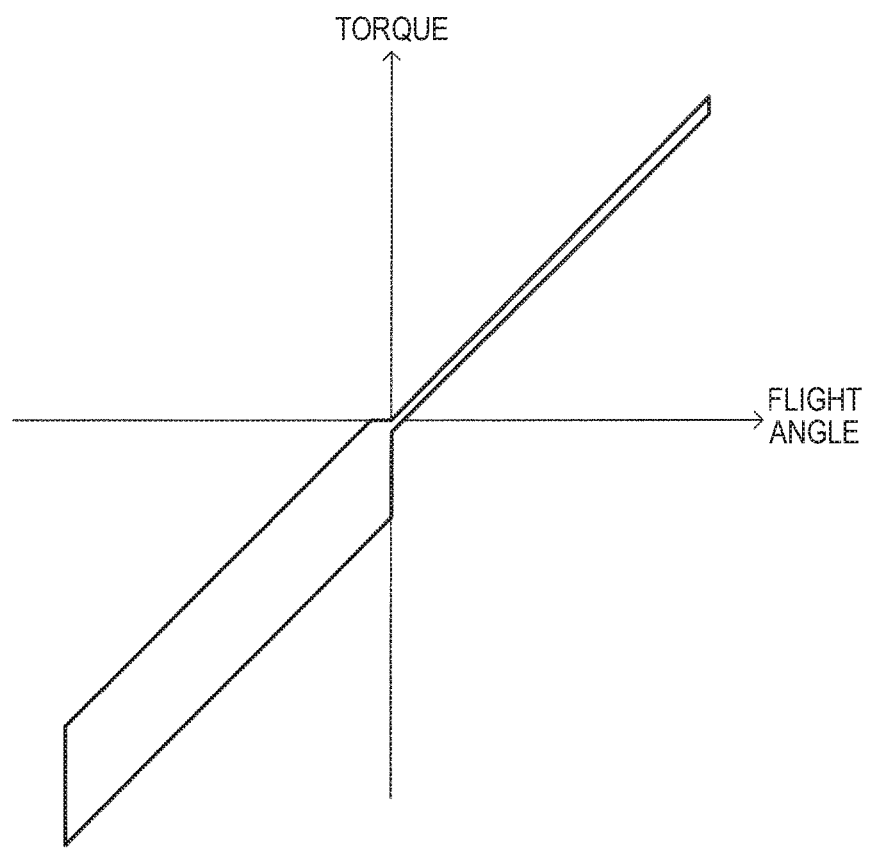
FIG. 6 is a view for describing a hysteresis property.

The present apparatus 1 of the second embodiment, which is configured in this manner, includes the control plate 21 and the control plate 22, and includes the thrust member 23, the disk spring 24, and the thrust member 25. As a result of this, as shown in FIG. 6, it is possible to switch the hysteresis properties that represent the relationship between the flight angle and the torque in accordance with the flight angle relative to the input shaft S of the disk plate 3 and the disk plate 4. More specifically, as shown in FIG. 6, for example, it is possible to switch (vary) the hysteresis properties in accordance with the flight angle so as to exhibit low hysteresis properties for positive flight angles that conform with the rotation direction of the input shaft S and to exhibit high hysteresis properties for negative flight angles that are opposite the rotation direction of the input shaft S. Further, in a case in which such hysteresis properties are exhibited, the thrust members 10, 11, 14, 16, 23, and 25, and the disk springs 12, 15, and 24 that are provided in the present apparatus 1 are respectively independent of one another, and therefore, it is possible to freely set the frictional forces generated in accordance with sliding contact.

Therefore, according to the second embodiment, in the same manner as the above-mentioned first embodiment, the flange section position and the intermediate plate position are respectively determined independently of one another using the disk plate 3, which is the reference outer contour plate, as a reference. As a result of this, it is possible to reduce the size in the axial direction of the present apparatus 1. Further, in the second embodiment, the control plates 21 and 22, the thrust members 23 and 25, and the disk spring 24 are added to the present apparatus 1 having a reduced size in the axial direction, and it is possible to switch the hysteresis properties. Accordingly, it is possible to achieve miniaturization in comparison with a case in which a configuration that switches the hysteresis properties is provided in torque fluctuation absorbing apparatuses of the related art. Additionally, other effects of the second embodiment are the same effects as the case of the above-mentioned first embodiment.

Third Embodiment

In the present apparatus 1 of the above-mentioned first embodiment, as shown in FIGS. 1 and 2, the rotation stopping section 10a, which is cylindrical, and is configured to have a concave-convex form in the circumferential direction of the axis of rotation J, is provided on the thrust member 10, which is the first sliding-contact member, and the inner circumferential section 3a of the disk plate 3, which is the reference outer contour plate, engages with the rotation stopping section 10a. As a result of this, in a case in which rotation of the thrust member 10 is inhibited by the disk plate 3, the hub member 2 rotates with the input shaft S in an integral manner, and relative rotation occurs between the thrust member 10 and the flange section 2b, a frictional force is generated between the thrust member 10 and the flange section 2b.

It should be noted that the size of the outer diameter of the large diameter section 10c of the thrust member 10 is larger than the size of the inner diameter of the inner circumferential section 51a of the first plate 51 of the intermediate plate 5. Therefore, during the assembly of the present apparatus 1, firstly, the first plate 51 and the second plate 52 that configure the intermediate plate 5 are crimped by the pin member 53 in a state in which the thrust member 10 is disposed on the hub member 2. In this case, although a frictional force is generated between the boss section 2a and the flange section 2b of the hub member 2, the thrust member 10 is not fixed so as to be incapable of rotating relative to the flange section 2b or the first plate 51.

Accordingly, when assembling the disk plate 3, it is necessary to rotate and adjust the thrust member 10 to correspond to the assembly rotational position of the disk plate 3, and to adjust the assembly rotational position after the disk plate 3 is engaged with the rotation stopping section 10a of the thrust member 10. Therefore, the assembly work of the present apparatus 1 is complicated. In such an instance, in the third embodiment, the above-mentioned effects, which are described in the first embodiment are retained, and the assembly workability of the present apparatus 1 is ameliorated and improved. Hereinafter, the third embodiment will be specifically described.

Figure 7:
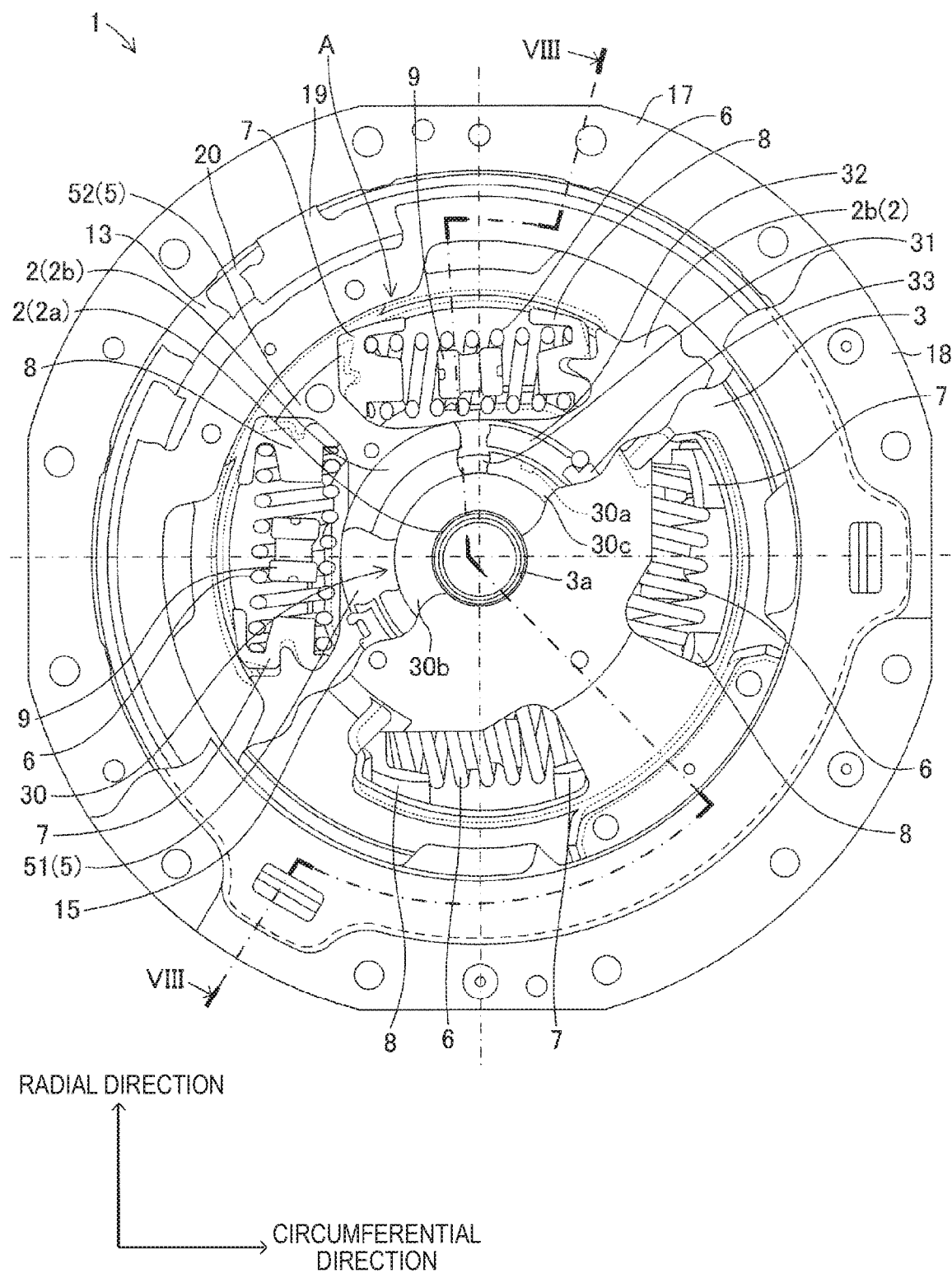
FIG. 7 relates to a third embodiment of the present disclosure, and is a partial cutout view that shows a configuration of a torque fluctuation absorbing apparatus.
Figure 8:
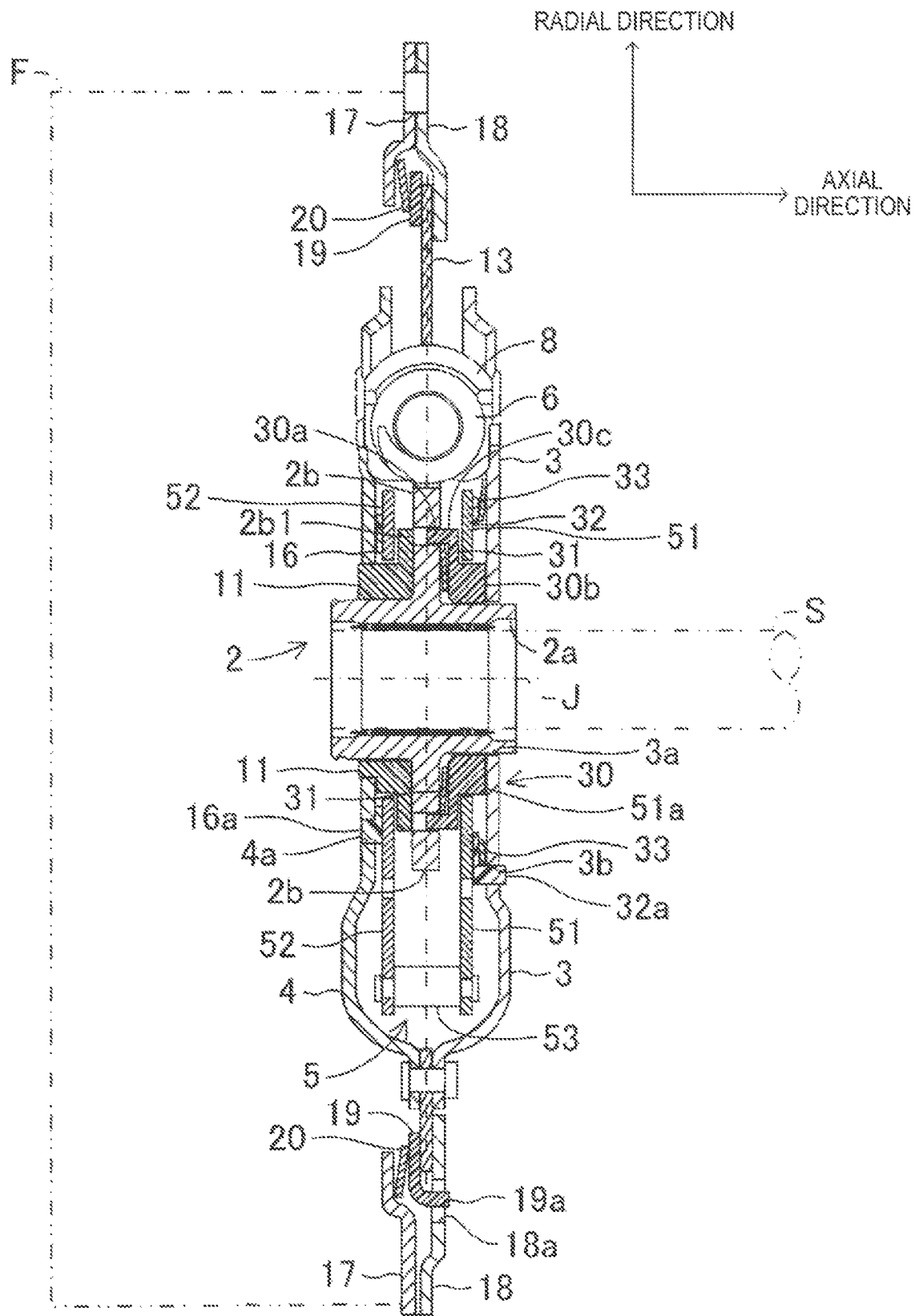
FIG. 8 is a cross-sectional view that shows the torque fluctuation absorbing apparatus along a cross-section VIII-VIII in FIG. 7.

As shown in FIGS. 7 and 8, the present apparatus 1 of the third embodiment is provided with a thrust member 30, which is a third sliding-contact member, in place of the thrust member 10, which is the first sliding-contact member in the above-mentioned first embodiment. The thrust member 30 is disposed between a disk spring 31, which is a third pressing member, and the disk plate 3, which is the reference outer contour plate, at the outer circumference of the boss section 2a of the hub member 2 and makes sliding contact with the disk plate 3.

The thrust member 30 is formed in a stepped cylindrical form, and is provided with a rotation stopping section 30a, a small diameter section 30b, and a large diameter section 30c. As shown in FIG. 8, the rotation stopping section 30a is provided on the large diameter section 30c, and is formed in a projecting form that projects toward the flange section 2b of the hub member 2. The rotation stopping section 30a is inserted into an engagement hole 2b1 formed in the flange section 2b, and fixes the thrust member 30 so as to be incapable of rotating relative to the hub member 2 and the disk spring 31, which will be mentioned later. The small diameter section 30b is inserted through the inner circumferential section 51a of the first plate 51 of the intermediate plate 5. The small diameter section 30b makes sliding contact with the disk plate 3 at a tip end. In this instance, as shown in FIG. 8, the size of the outer diameter of the small diameter section 30b is set so as to be greater than the size of the inner diameter of the inner circumferential section 3a of the disk plate 3. The large diameter section 30c is formed so as to have a larger diameter than the size of the outer diameter of the small diameter section 30b at a base end of the small diameter section 30b, and the rotation stopping section 30a is provided in an integral manner on the outer circumferential side.

As shown in FIG. 8, the disk spring 31, which is the third pressing member, is disposed between the thrust member 30 and the flange section 2b of the hub member 2. In the disk spring 31, one end side is fixed so as to be incapable of rotating relative to the rotation stopping section 30a of the thrust member 30, and the other end side contacts the small diameter section 30b of the thrust member 30. As a result of this, the disk spring 31 is incapable of rotating relative to the thrust member 30, and biases the thrust member 30 toward the disk plate 3 side.

In the thrust member 30 of the present apparatus 1 of the third embodiment, the rotation stopping section 30a is fixed to the flange section 2b of the hub member 2, and the small diameter section 30b is in contact with (abuts against) the disk plate 3, which is the reference outer contour plate, as a result of the disk spring 31, which is fixed to the rotation stopping section 30a. As a result of this, the thrust member 30 works in cooperation with the disk spring 31, and determines the position in the axial direction of the axis of rotation J of the hub member 2 (or more specifically, the flange section 2b of the hub member 2), that is, the flange section position, using the position in the axial direction of the disk plate 3, which is the reference outer contour plate, as a reference.

A thrust member 32, which is a fourth sliding-contact member, is configured in the same manner as the thrust member 14, as the second sliding-contact member in the above-mentioned second embodiment. That is, the thrust member 32 is disposed between the disk plate 3 and the first plate 51 of the intermediate plate 5 further on the outward side in the radial direction than the thrust member 30, and makes sliding contact with the first plate 51. The thrust member 32 is biased toward the first plate 51 side by the disk spring 33, which is the fourth pressing member. In the same manner as the thrust member 14, the thrust member 32 includes an escape prevention section 32a, which extends passing through the hole section 3b provided further on the outer circumferential side than an abutting section of the disk plate 3 with the disk spring 33. The thrust member 32, which is assembled on the disk plate 3 as a result of engagement of the escape prevention section 32a and the hole section 3b, works in cooperation with the disk spring 33, and determines the intermediate plate position, which is the position in the axial direction of the axis of rotation J of the first plate 51, using the position in the axial direction of the disk plate 3, which is the reference outer contour plate, as a reference.

In the same manner as the disk spring 15 of the above-mentioned first embodiment, the disk spring 33, which is the fourth pressing member, is disposed between the disk plate 3 and the thrust member 32. The disk spring 33 biases the thrust member 32 toward the first plate 51 side. Accordingly, in the same manner as the disk spring 15, the disk spring 33 determines the intermediate plate position of the first plate 51 using the position in the axial direction of the disk plate 3 as a reference. Additionally, in the present apparatus 1 of the third embodiment, the configuration on the disk plate 4 side is the same configuration as that of the above-mentioned first embodiment.

During assembly of the present apparatus 1 of the third embodiment, which is configured in this manner, the thrust member 30, which is the third sliding-contact member, and the disk spring 31, which is the third pressing member, are inserted through the boss section 2a of the hub member 2. Further, the rotation stopping section 30a of the thrust member 30 is inserted into the engagement hole 2b1 formed on the flange section 2b, and the thrust member 30 and the disk spring 31 are fixed so as to be incapable of rotating relative to the hub member 2. In this manner, in the same manner as the above-mentioned first embodiment, the first plate 51 of the intermediate plate 5, the thrust member 32, which is the fourth sliding-contact member, and the disk spring 33, which is the fourth pressing member, are assembled in a state in which the thrust member 30 and the disk spring 31 are fixed, and the disk plate 3 is assembled. In this instance, in the third embodiment, when assembling the disk plate 3, unlike the case of the first embodiment, the disk plate 3 is assembled in a state of being inserted through the boss section 2a of the hub member 2 without adjusting the assembly rotational position relative to the thrust member 30.

As can be understood from the above-mentioned description, the torque fluctuation absorbing apparatus 1 of the above-mentioned third embodiment is provided with the thrust member 30, which is the third cylindrical sliding-contact member, which includes the rotation stopping section 30a that is disposed between at least the disk plate 3 that is the reference outer contour plate among the disk plates 3 and 4 that are the pair of outer contour plates, and the flange section 2b of the hub member 2, and is fixed so as to be incapable of rotating relative to the flange section 2b, and which makes sliding contact with the disk plate 3, which is the reference outer contour plate, the disk spring 31, which is the third circular pressing member, and which presses the thrust member 30 from the flange section 2b toward the disk plate 3, which is the reference outer contour plate, the thrust member 32, which is the fourth circular sliding-contact member, and which makes sliding contact with the first plate 51 of the intermediate plate 5, and the disk spring 33, which is the fourth pressing member, and which presses the thrust member 32 from the disk plate 3, which is the reference outer contour plate, toward the first plate 51 of the intermediate plate 5, the flange section position is determined by the thrust member 30 and the disk spring 31, and the intermediate plate position is determined by the thrust member 32 and the disk spring 33.

According to such a configuration, it is possible to determine the flange section position and the intermediate plate position using the thrust member 30 and the disk spring 31, and the thrust member 32 and the disk spring 33, which exhibit functions of absorbing (dampening) torque fluctuations. As a result of this, in the third embodiment, in the same manner as the above-mentioned first embodiment, in addition it being possible to achieve miniaturization of the present apparatus 1 without it being necessary to add other members in order to determine the flange section position and the intermediate plate position, it is possible to reduce the manufacturing cost of the present apparatus 1.

In addition, in the above-mentioned third embodiment, it is possible to easily fix the thrust member 30 and the disk spring 31 so as to be incapable of rotating relative to the flange section 2b of the hub member 2 before crimping and fixing the intermediate plate 5 (the first plate 51 and the second plate 52) by using the pin member 53. Furthermore, it is possible to easily assemble the disk plate 3 on the boss section 2a of the hub member 2 without adjusting the assembly rotational position of the disk plate 3 relative to the thrust member 30, which is fixed so as to be incapable of relative rotation. Accordingly, in the present apparatus 1 of the third embodiment, it is possible to greatly improve assembly workability.

In addition, in this case, the thrust member 30, which is the third sliding-contact member, includes the small diameter section 30b, which is inserted through the first plate 51 of the intermediate plate 5, and which makes sliding contact with at least the disk plate 3, which is the reference outer contour plate among the disk plates 3 and 4, which are the pair of outer contour plates, at a tip end, and the large diameter section 30c, which is configured to have a larger diameter than the outer diameter of the small diameter section 30b at the base end of the small diameter section 30b, and in which the rotation stopping section 30a is provided, and the size of the outer diameter of the small diameter section 30b is set so as to be greater than the size of the inner diameter of the inner circumferential section 3a of at least the disk plate 3, which is the reference outer contour plate among the disk plates 3 and 4, which are the pair of outer contour plates.

According to such a configuration, since it is possible to make the outer diameter of the small diameter section 30b of the thrust member 30 greater than the inner diameter of the inner circumferential section 3a of the disk plate 3, it is possible to increase the friction surface area of the small diameter section 30b that makes sliding contact with the disk plate 3. As a result of this, in a case in which relative rotation between the hub member 2 and the disk plate 3 occurs in conjunction with torque fluctuation, it is possible for the thrust member 30 to favorably absorb (dampen) the torque fluctuation that has occurred.

Fourth Embodiment

In the above-mentioned third embodiment, the thrust member 30, which is the third sliding-contact member, is fixed so as to be incapable of rotating relative to the flange section 2b of the hub member 2 using the rotation stopping section 30a. In this instance, in the present apparatus 1 of the above-mentioned third embodiment, in the same manner as the above-mentioned second embodiment, it is possible to provide the control plate 21, the control plate 22, the thrust member 23, the disk spring 24, the thrust member 25, and the pin member 26, and to vary the hysteresis properties.

Figure 9:
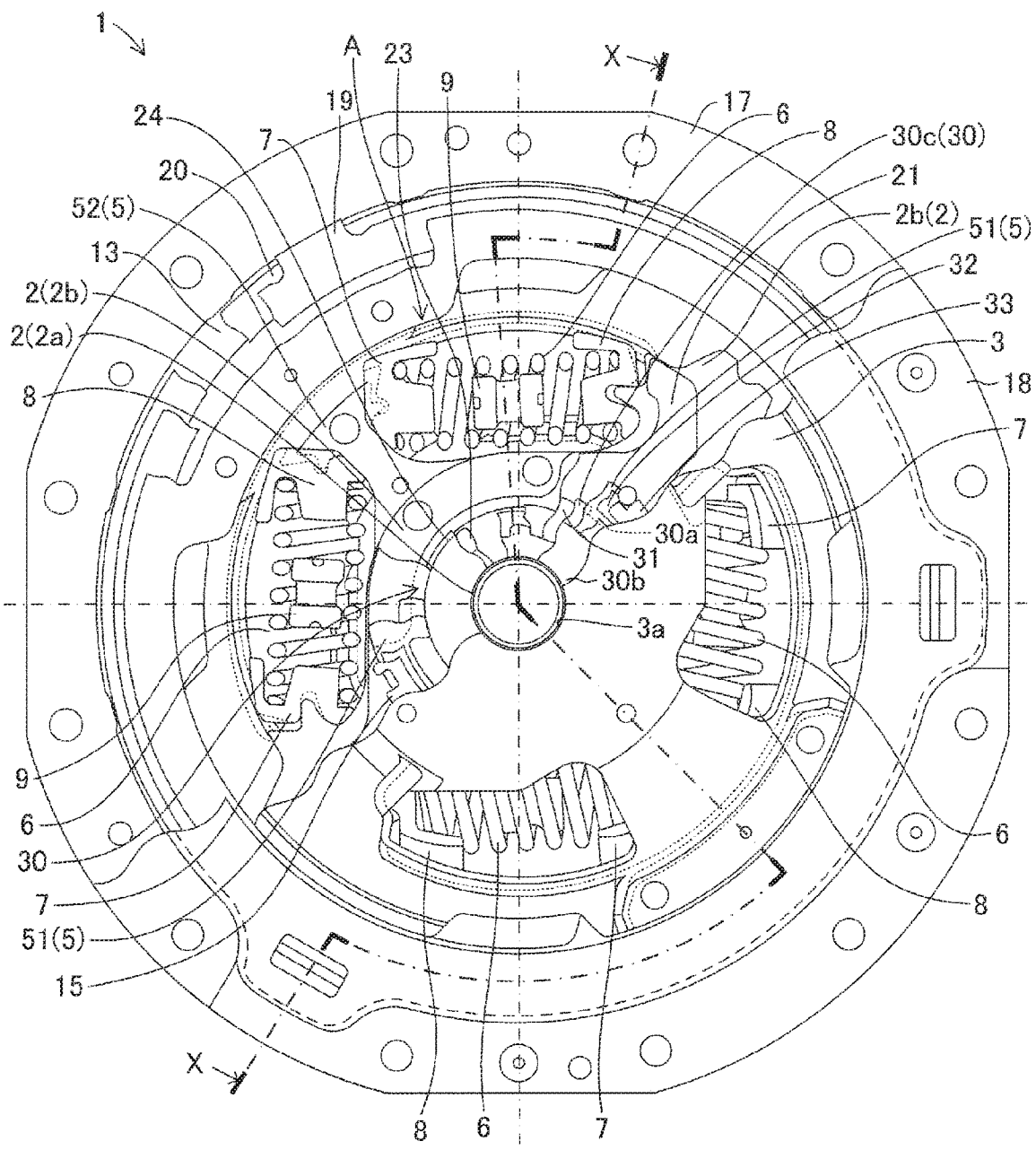
FIG. 9 relates to a fourth embodiment of the present disclosure, and is a partial cutout view that shows a configuration of a torque fluctuation absorbing apparatus.
Figure 10:
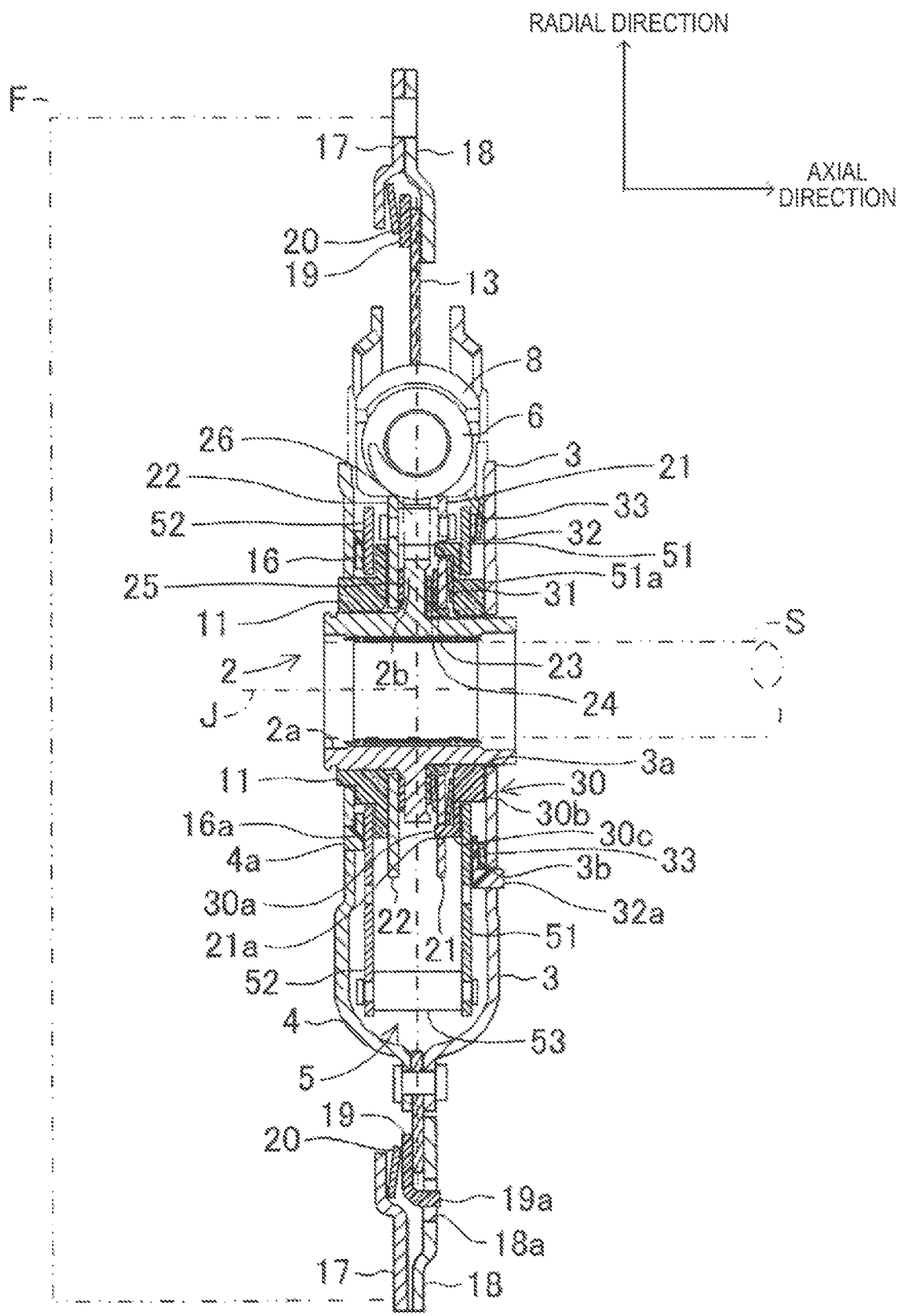
FIG. 10 is a cross-sectional view that shows the torque fluctuation absorbing apparatus along a cross-section X-X in FIG. 9.

In this case, as shown in FIGS. 9 and 10, in the same manner as the above-mentioned second embodiment, the control plate 21, the thrust member 23, and the disk spring 24 are provided between the flange section 2b of the hub member 2 and the thrust member 30. It should be noted that, in the manner described in the above-mentioned second embodiment, the control plate 21 is fixed so as to be capable of rotating in an integral manner with the control plate 22 and the flange section 2b of the hub member 2 by the pin member 26. Accordingly, in the fourth embodiment, assembly workability is improved by fixing the thrust member 30, which is the third sliding-contact member, so as to be incapable of rotating relative to the control plate 21, which rotates in an integral manner with the flange section 2b of the hub member 2. Hereinafter, the fourth embodiment will be specifically described.

In the fourth embodiment, as shown in FIG. 10, the rotation stopping section 30a of the thrust member 30 is provided in the large diameter section 30c, and is formed in a projecting manner that projects toward the control plate 21. Further, the rotation stopping section 30a of the fourth embodiment is insert into an engagement hole 21a formed in the control plate 21, and is fixed so as to be incapable of rotating relative to the control plate 21. In this instance, the control plate 21 is fixed so as to be capable of rotating in an integral manner with the flange section 2b of the hub member 2. Accordingly, in the fourth embodiment, the thrust member 30 is fixed so as to be incapable of rotating relative to the hub member 2 and the disk spring 31, which is the third pressing member. Additionally, other configurations are similar to those of the second embodiment and the third embodiment.

During the assembly of the present apparatus 1 of the fourth embodiment, which is configured in this manner, firstly, the thrust member 23 and the disk spring 24 are inserted through to the disk plate 3 side of the boss section 2a of the hub member 2, and the thrust member 25 is inserted through to the disk plate 4 side of the boss section 2a. Further, in this state, the control plate 21 and the control plate 22 are fixed by the pin member 26 so as to be capable of rotating in an integral manner with the flange section 2b of the hub member 2.

Subsequently, the thrust member 30, which is the third sliding-contact member, and the disk spring 31, which is the third pressing member, are inserted through the boss section 2a of the hub member 2. Further, the rotation stopping section 30a of the thrust member 30 is inserted into the engagement hole 21a formed on the control plate 21, the thrust member 30 and the disk spring 31 are fixed so as to be incapable of rotating relative to the control plate 21 and consequently, the hub member 2. In this manner, in the same manner as the above-mentioned third embodiment, the first plate 51 of the intermediate plate 5, the thrust member 32, which is the fourth sliding-contact member, and the disk spring 33, which is the fourth pressing member, are assembled in a state in which the thrust member 30 and the disk spring 31 are fixed, and the disk plate 3 is assembled. In this instance, in the fourth embodiment, when assembling the disk plate 3, in the same manner as the above-mentioned third embodiment, the disk plate 3 is assembled in a state of being inserted through the boss section 2a of the hub member 2 without adjusting the assembly rotational position relative to the thrust member 30.

Accordingly, the torque fluctuation absorbing apparatus 1 of the fourth embodiment is provided with the circular control plates 21 and 22, which are coupled so as to be capable of rotating in an integral manner with the hub member 2, and the rotation stopping section 30a of the thrust member 30, which is the third sliding-contact member, is fixed so as to be incapable of rotating relative to the control plate 21 among the control plates 21 and 22.

According to such a configuration, even in a case in which the control plates 21 and 22 are provided, it is possible to easily fix the thrust member 30 and the disk spring 31 so as to be incapable of rotating relative to the control plate 21, that is, the hub member 2, which is coupled so as to be capable of rotating in an integral manner, before crimping and fixing the intermediate plate 5 (the first plate 51 and the second plate 52) by using the pin member 53. Furthermore, it is possible to easily assemble the disk plate 3 on the boss section 2a of the hub member 2 without adjusting the assembly rotational position of the disk plate 3 relative to the thrust member 30, which is fixed so as to be incapable of relative rotation. Accordingly, in the present apparatus 1 of the fourth embodiment, it is possible to greatly improve assembly workability. Other effects are the same effects as those of the above-mentioned second embodiment and the above-mentioned third embodiment.

Modification Example of Third Embodiment and Fourth Embodiment

In the above-mentioned third embodiment and the above-mentioned fourth embodiment, among the disk plates 3 and 4, which are the pair of outer contour plates, the disk plate 3 is used as the reference outer contour plate. Further, the rotation stopping section 30a is provided in the thrust member 30, which is the third sliding-contact member that is disposed on the disk plate 3 side, and the rotation stopping section 30a engages with the engagement hole 2b1 provided in the flange section 2b of the hub member 2 or the engagement hole 21a provided in the control plate 21.

Figure 11:
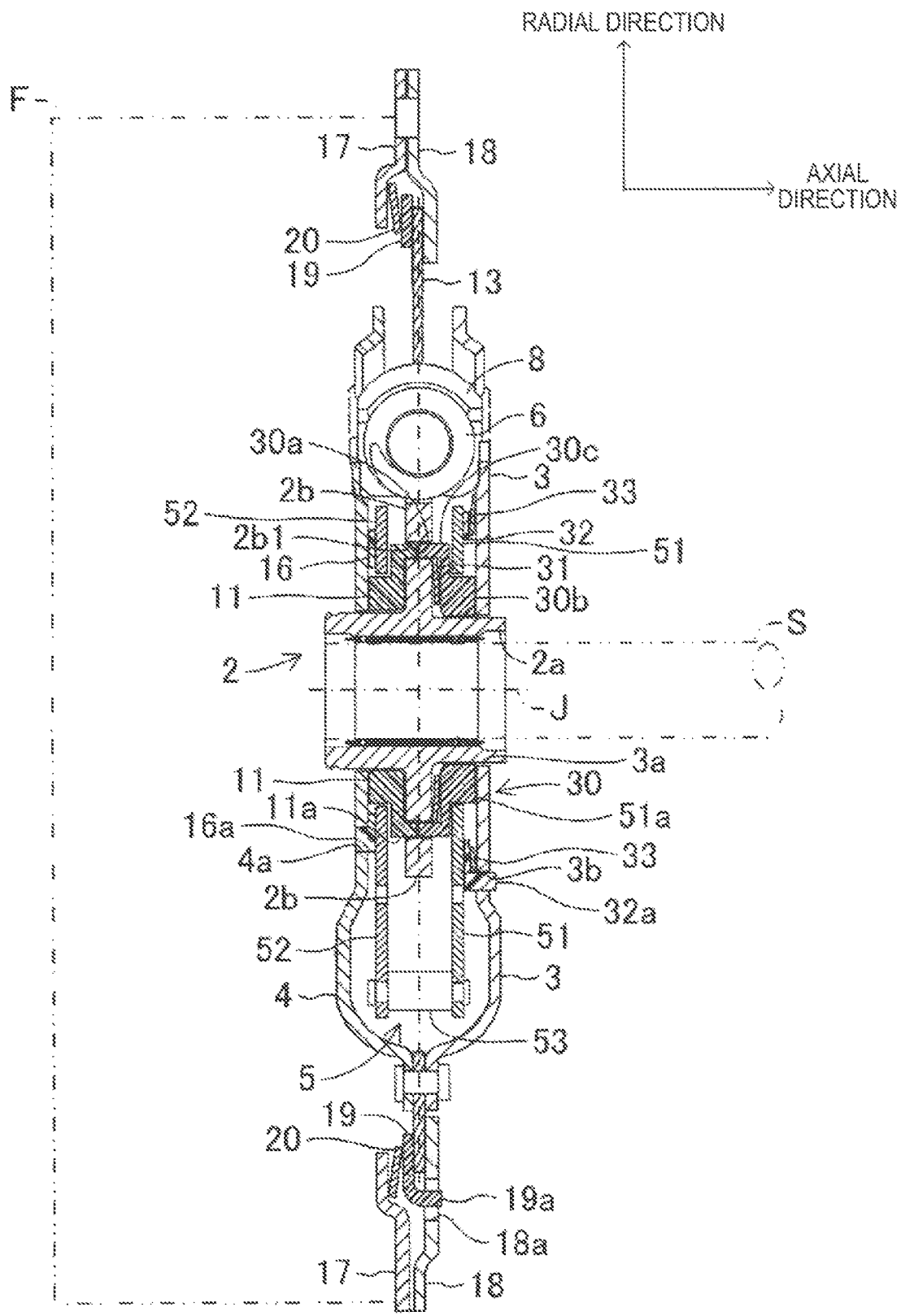
FIG. 11 is a cross-sectional view that shows a torque fluctuation absorbing apparatus according to a modification example of the third embodiment and the fourth embodiment of the present disclosure.

In addition to this, as shown in FIG. 11, a rotation stopping section 11a, which corresponds to the rotation stopping section 30a provided in the thrust member 30, which is the third sliding-contact member, may also be provided in the thrust member 11, which is disposed on the disk plate 4 side. In this case, the concave-convex rotation stopping section that is provided in the thrust member 11 and engages with the inner circumferential section of the disk plate 4 is omitted. Additionally, FIG. 11 shows a case of the present apparatus 1 of the above-mentioned third embodiment.

In this manner, in a case in which the rotation stopping section 11a is provided in the thrust member 11, in the same manner as the cases of the above-mentioned third embodiment and the above-mentioned fourth embodiment, the rotation stopping section 11a engages with the engagement hole 2b1 provided in the flange section 2b or an engagement hole 22a provided in the control plate 22. As a result of this, in the same manner as the thrust member 30 in the above-mentioned third embodiment and the above-mentioned fourth embodiment, the thrust member 11 is fixed so as to be incapable of rotating relative to the hub member 2.

As a result of this, in the modification example, when assembling the disk plate 4, it is not necessary to adjust the assembly rotational position of the disk plate 4. Accordingly, in the modification example, it is possible to easily assemble the disk plates 3 and 4 on the hub member 2, and as a result, it is possible to greatly improve assembly workability.

When implementing the present disclosure, the disclosure is not limited to the various above-mentioned embodiments, and it is possible to adopt various modification examples as long as the implementation does not depart from the object of the present disclosure.

For example, in each of the above-mentioned embodiments, the flange section position of the flange section 2b of the hub member 2 and the intermediate plate position of the intermediate plate 5 (the first plate 51) are determined using the disk plate 3 as the reference outer contour plate. In place of this, it is also possible to determine the flange section position and the intermediate plate position of the intermediate plate 5 (the second plate 52) using the disk plate 4, which is one of the disk plates 3 and 4, which are the pair of outer contour plates, as the reference outer contour plate.

In this case, the thrust member 10, which is the first sliding-contact member, and the thrust member 14, which is the second sliding-contact member, in the above-mentioned first embodiment and the above-mentioned second embodiment are disposed between the disk plate 4 and the flange section 2b of the hub member 2 so as to be symmetric to a planar surface that is orthogonal to the axis of rotation J. In addition, the thrust member 30, which is the third sliding-contact member, and the thrust member 32, which is the fourth sliding-contact member, in the above-mentioned third embodiment and the above-mentioned fourth embodiment are disposed between the disk plate 4 and the flange section 2b of the hub member 2 so as to be symmetric to a planar surface that is orthogonal to the axis of rotation J. As a result of such configurations, similar effects to those of each of the above-mentioned embodiments are also obtained in a case in which the disk plate 4 is used as the reference outer contour plate.

A torque fluctuation absorbing apparatus according to an aspect of this disclosure absorbs torque fluctuations that occur in a torque transmission pathway from an input side rotating member to an output side rotating member, and includes a vibration absorbing member in which a plurality of elastic members are coupled in series, and which absorbs torque fluctuations, a pair of circular outer contour plates, that are coupled to the input side rotating member and are disposed so as to be spatially separated from one another in an axial direction of an output side rotating member, a hub member that includes a boss section, which is coupled to the output side rotating member, and a flange section, which is provided on the boss section and is disposed between the pair of outer contour plates, and a circular intermediate plate, that is disposed between the flange section of the hub member, and the pair of outer contour plates, is coupled between the serial elastic members that configure the vibration absorbing member, and transmits a torque from one elastic member among the serial elastic members to another elastic member among the serial elastic members, in which a flange section position, which is a position in the axial direction of the flange section, is determined using a position in the axial direction of a reference outer contour plate, which is one of the pair of outer contour plates as a reference, and an intermediate plate position, which is a position in the axial direction of the intermediate plate, is determined using a position in the axial direction of the reference outer contour plate, as a reference.

With this configuration, the flange section position of the flange section of the hub member is determined using the reference outer contour plate, as a reference. In addition, the intermediate plate position of the intermediate plate is determined using the reference outer contour plate as a reference. That is, in the torque fluctuation absorbing apparatus of the present disclosure, it is possible to determine the flange section position and the intermediate plate position independently of one another using the reference outer contour plate as a reference. Accordingly, since it is possible to reduce the number of members that determine the flange section position and it is possible to reduce the number of members that determine the intermediate plate position, it is possible to decrease the size of the allowable tolerance that is set and added for each member. As a result of this, it is possible to reduce the dimension in the axial direction of the torque fluctuation absorbing apparatus, and therefore, it is possible to achieve miniaturization of the torque fluctuation absorbing apparatus.

The torque fluctuation absorbing apparatus according to the aspect of this disclosure may be configured such that the torque fluctuation absorbing apparatus further includes: a first cylindrical sliding-contact member that is assembled at the outer circumference of the boss section of the hub member, makes sliding contact with the boss section, and makes sliding contact with the flange section; a first circular pressing member that presses the first sliding-contact member from the reference outer contour plate toward the flange section; a second circular sliding-contact member that makes sliding contact with the intermediate plate; and a second pressing member that presses the second sliding-contact member from the reference outer contour plate toward the intermediate plate, the flange section position is determined by the first sliding-contact member and the first pressing member, and the intermediate plate position is determined by the second sliding-contact member and the second pressing member.

The torque fluctuation absorbing apparatus according to the aspect of this disclosure may be configured such that the first sliding-contact member includes a small diameter section that is inserted through the intermediate plate, and a large diameter section that makes sliding contact with the flange section, and is provided to have a larger diameter than an outer diameter of the small diameter section, and a size of an outer diameter of the large diameter section is set so as to be greater than a size of an inner diameter of an inner circumferential section of the intermediate plate.

The torque fluctuation absorbing apparatus according to the aspect of this disclosure may be configured such that the small diameter section is in contact with the inner circumferential section of the intermediate plate.

The torque fluctuation absorbing apparatus according to the aspect of this disclosure may be configured such that a magnitude of a thrust load generated as a result of the first sliding-contact member making sliding contact with the flange section and a magnitude of a thrust load generated as a result of the second sliding-contact member making sliding contact with the intermediate plate differ from one another, and a magnitude of a pressing force with which the first pressing member presses the first sliding-contact member against the flange section and a magnitude of a pressing force with which the second pressing member presses the second sliding-contact member against the intermediate plate differ from one another.

The torque fluctuation absorbing apparatus according to the aspect of this disclosure may be configured such that the torque fluctuation absorbing apparatus further includes: a third cylindrical sliding-contact member that is disposed between at least the reference outer contour plate, among the pair of outer contour plates, and the flange section, includes a rotation stopping section that is fixed so as to be non-rotatable to the flange portion, and makes sliding contact with the reference outer contour plate; a third circular pressing member that presses the third sliding-contact member from the flange section toward the reference outer contour plate; a fourth circular sliding-contact member that makes sliding contact with the intermediate plate; and a fourth pressing member that presses the fourth sliding-contact member from the reference outer contour plate toward the intermediate plate, the flange section position is determined by the third sliding-contact member and the third pressing member, and the intermediate plate position is determined by the fourth sliding-contact member and the fourth pressing member.

The torque fluctuation absorbing apparatus according to the aspect of this disclosure may be configured such that the torque fluctuation absorbing apparatus further includes a circular control plate that is coupled so as to be integrally rotatable with the hub member, and the rotation stopping section of the third sliding-contact member is fixed so as to be non-rotatable to the control plate.

The torque fluctuation absorbing apparatus according to the aspect of this disclosure may be configured such that the third sliding-contact member includes a small diameter section that is inserted through the intermediate plate and makes sliding contact with at least the reference outer contour plate, among the pair of outer contour plates, at a tip end, and a large diameter section that is configured to have a larger diameter than the outer diameter of the small diameter section at a base end of the small diameter section and includes the rotation stopping section, and a size of an outer diameter of the small diameter section is set so as to be greater than a size of an inner diameter of an inner circumferential section of at least the reference outer contour plate among the pair of outer contour plates.

Furthermore, in each of the above-mentioned embodiments, the coil springs 6 are coupled in series as the plurality of elastic members. In this case, the plurality of elastic members is not limited to coil springs, and it is also possible to couple a plurality of spring members in series using a different type of spring member.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A torque fluctuation absorbing apparatus, which absorbs torque fluctuations that occur in a torque transmission pathway from an input side rotating member to an output side rotating member, the apparatus comprising:
   a vibration absorbing member in which a plurality of elastic members are coupled in series, and which absorbs torque fluctuations;
   a pair of circular outer contour plates that are coupled to the input side rotating member, and are disposed so as to be spatially separated from one another in an axial direction of the output side rotating member;
   a hub member that includes a boss section which is coupled to the output side rotating member, and a flange section which is provided on the boss section and is disposed between the pair of outer contour plates;
   a first circular intermediate plate that is disposed between the flange section of the hub member and a first one of the pair of outer contour plates, and a second circular intermediate plate that is disposed between the flange section of the hub member and a second one of the pair of outer contour plates, the first intermediate plate and the second intermediate plate being coupled between the serial elastic members that configure the vibration absorbing member, and transmitting a torque from one elastic member among the serial elastic members to another elastic member among the serial elastic members;
   a first cylindrical sliding-contact member that is assembled at the outer circumference of the boss section of the hub member, makes sliding contact with the boss section, and makes sliding contact with the flange section;
   a first circular pressing member that is disposed between the flange section and the first one of the pair of outer contour plates and presses the first sliding-contact member from the first one of the pair of outer contour plates toward the flange section;
   a second circular sliding-contact member that makes sliding contact with the first intermediate plate; and
   a second pressing member that is disposed between the first intermediate plate and the first one of the pair of outer contour plates and presses the second sliding-contact member from the first one of the pair of outer contour plates toward the first intermediate plate.

2. The torque fluctuation absorbing apparatus according to claim 1,
   wherein the first sliding-contact member includes
      a small diameter section that is inserted through the first intermediate plate, and
      a large diameter section that makes sliding contact with the flange section, and is provided to have a larger diameter than an outer diameter of the small diameter section, and
   a size of an outer diameter of the large diameter section is set so as to be greater than a size of an inner diameter of an inner circumferential section of the first intermediate plate.

3. The torque fluctuation absorbing apparatus according to claim 2,
   wherein the small diameter section is in contact with the inner circumferential section of the first intermediate plate.

4. The torque fluctuation absorbing apparatus according to claim 1,
   wherein a magnitude of a thrust load generated as a result of the first sliding-contact member making sliding contact with the flange section and a magnitude of a thrust load generated as a result of the second sliding-contact member making sliding contact with the first intermediate plate differ from one another, and
   a magnitude of a pressing force with which the first pressing member presses the first sliding-contact member against the flange section and a magnitude of a pressing force with which the second pressing member presses the second sliding-contact member against the first circular intermediate plate differ from one another.

* * * * *